United States Patent
Ishikawa et al.

(10) Patent No.: US 6,457,165 B1
(45) Date of Patent: Sep. 24, 2002

(54) WIRING HARNESS ARRANGEMENT DESIGNING APPARATUS AND METHOD THEREFOR

(75) Inventors: Takeshi Ishikawa, Shizuoka-ken (JP); Masaharu Hayashi, Shizuoka-ken (JP); Yukihiro Nozue, Shizuoka-ken (JP); Masao Igarashi, Shizuoka-ken (JP); Fumio Sugiyama, Shizuoka-ken (JP); Kazuhiko Shiratori, Shizuoka-ken (JP)

(73) Assignees: Yazaki Corporation, Tokyo (JP); Sunsei Co., Ltd., Shizuoka (JP)

(*) Notice: Subject to any disclaimer, the term of this patent is extended or adjusted under 35 U.S.C. 154(b) by 0 days.

(21) Appl. No.: 09/450,222

(22) Filed: Nov. 29, 1999

(30) Foreign Application Priority Data

Nov. 30, 1998 (JP) .......................... 10-340262

(51) Int. Cl.[7] .......................... G06F 17/50; H02B 1/20; H01B 3/00
(52) U.S. Cl. .......................... 716/12; 716/8; 361/827; 361/828; 174/72 A; 703/1
(58) Field of Search ............... 716/1–21; 361/826–828; 174/72 A; 703/1

(56) References Cited

U.S. PATENT DOCUMENTS

| | | | | |
|---|---|---|---|---|
| 3,842,496 A | * | 10/1974 | Mercer | 29/867 |
| 3,863,319 A | * | 2/1975 | Pellet | 29/714 |
| 3,913,202 A | * | 10/1975 | Pyle et al. | 29/721 |
| 4,190,890 A | * | 2/1980 | Marx | 716/1 |
| 4,218,745 A | * | 8/1980 | Perkins | 716/4 |
| 4,424,627 A | * | 1/1984 | Tarbox | 29/857 |
| 4,575,840 A | * | 3/1986 | Hargrave et al. | 370/463 |
| 4,711,026 A | * | 12/1987 | DeSanto | 29/854 |
| 4,859,953 A | * | 8/1989 | Young et al. | 324/539 |
| 5,021,968 A | * | 6/1991 | Ferketic | 703/1 |
| 5,250,758 A | * | 10/1993 | Fjelstad et al. | 174/254 |
| 5,293,479 A | * | 3/1994 | Quintero et al. | 345/841 |
| 5,329,464 A | * | 7/1994 | Sumic et al. | 703/1 |
| 5,442,518 A | * | 8/1995 | Beam | 361/690 |
| 5,461,576 A | * | 10/1995 | Tsay et al. | 716/6 |
| 5,475,611 A | * | 12/1995 | Nagase et al. | 716/13 |
| 5,587,890 A | * | 12/1996 | Happ et al. | 361/826 |
| 5,680,330 A | * | 10/1997 | Kunimi et al. | 702/157 |
| 5,773,762 A | * | 6/1998 | Orr et al. | 174/117 M |
| 5,805,402 A | * | 9/1998 | Maue et al. | 361/93.1 |
| 5,822,214 A | * | 10/1998 | Rostoker et al. | 716/10 |
| 5,869,907 A | * | 2/1999 | Marler | 307/10.1 |
| 5,911,450 A | * | 6/1999 | Shibata et al. | 29/407.04 |
| 6,048,020 A | * | 4/2000 | Gronowicz et al. | 296/70 |
| 6,051,782 A | * | 4/2000 | Wagner | 174/52.1 |
| 6,226,560 B1 | * | 5/2001 | Hamma et al. | 700/97 |

FOREIGN PATENT DOCUMENTS

| | | | | |
|---|---|---|---|---|
| JP | 07-274345 | 10/1995 | | H02G/3/00 |
| JP | 08-221459 | 8/1996 | | G06F/17/50 |

* cited by examiner

Primary Examiner—Vuthe Siek
Assistant Examiner—Phallaka Kik
(74) Attorney, Agent, or Firm—Finnegan, Henderson, Farabow, Garrett, & Dunner, L.L.P.

(57) ABSTRACT

A route information inputting section inputs route information including route drawing information on routes of a plurality of wiring harnesses to be arranged within a vehicle and route length information of each wiring harness. A wiring information memory stores wiring information including auxiliary unit information on a plurality of auxiliary units connected to the plurality of wiring harnesses and wire information on attributes of a plurality of wires connected between the plurality of auxiliary units. A display section displays on a screen a route drawing based on the route information input. An auxiliary unit position assigning section assigns positions of the plurality of auxiliary units on the route drawing displayed on the screen based on the auxiliary unit information included in the wiring information stored by the wiring information memory. A route/wiring linking section mutually wire-connects the plurality of auxiliary units of which positions have been assigned by the auxiliary unit position assigning section through a selective route on the route drawing, and links the wiring information on the plurality of wire-connected auxiliary units to the route information on the selected route.

16 Claims, 19 Drawing Sheets

FIG.5

| WIRING INFORMATION | | WIRE INFORMATION | | |
|---|---|---|---|---|
| AUXILIARY UNIT INFORMATION | TERMINAL INFORMATION | KIND OF WIRE | WIRE DIAMETER | COLOR |
| 6-1~6-2 | AAA | 2G | 0.50 | W |
| | BBB | 2G | 0.50 | B |
| | CCC | 2G | 0.50 | R |
| | DDD | 2G | 0.50 | Y |
| 6-3~(6-1,6-2) | A | 2G | 0.50 | WW |
| | B | 2G | 0.50 | BB |
| | C | 2G | 0.50 | RR |
| | D | 2G | 0.50 | YY |

FIG.6

| ROUTE INFORMATION | | |
|---|---|---|
| PASSING POINT | ROUTE | LENGTH OF HARNESS |
| a-b | P1 | 400 |
| b-c | P2 | 300 |
| d-e | P3 | 400 |
| e-f | P4 | 300 |
| b-e | P5 | 300 |

FIG.7

| ACTUAL WIRING INFORMATION | | | | |
|---|---|---|---|---|
| WIRING CONNECTION INFORMATION | LENGTH | WIRE INFORMATION | | |
| | | KIND OF WIRE | WIRE DIAMETER | COLOR |
| 6-1~P1~P2~6-2 | 600 | 2G | 0.50 | W |
| | 600 | 2G | 0.50 | B |
| | 600 | 2G | 0.50 | R |
| | 600 | 2G | 0.50 | Y |
| 6-3~P3~P5~b | 900 | 2G | 0.50 | WW |
| | 900 | 2G | 0.50 | BB |
| | 900 | 2G | 0.50 | RR |
| | 900 | 2G | 0.50 | YY |

FIG.16

| NAME OF VEHICLE | | SYSTEM | TOTAL | PORTION | TOTAL | SPECIFICATION |
| CIRCUIT | ROUTE | SUM UP | | SETTING | | |
| DRAWING | EDITING | DISPLAY | | | | |

☐ SUM UP

| KIND OF WIRE | WIRE DIAMETER | COLOR | LENGTH | From | | To | |
|---|---|---|---|---|---|---|---|
| 2G | 0.50 | W | 600 | 6-1 | AAA | to 6-2 | AAA |
| 2G | 0.50 | B | 600 | 6-1 | BBB | to 6-2 | BBB |
| 2G | 0.50 | R | 600 | 6-1 | CCC | to 6-2 | CCC |
| 2G | 0.50 | Y | 600 | 6-1 | DDD | to 6-2 | DDD |
| 2G | 0.50 | WW | 400 | 6-3 | 4 | to JOINT4 | A66 |
| 2G | 0.50 | BB | 800 | 6-3 | 3 | to JOINT3 | B66 |
| 2G | 0.50 | RR | 400 | 6-3 | 2 | to JOINT2 | C66 |
| 2G | 0.50 | YY | 400 | 6-3 | 1 | to JOINT1 | D66 |

FIG.18

| SPECIFICATION | STD | OPT | MAX |
|---|---|---|---|
| ABS | × | ◯ (FOUR WIRES) | ◯ (FOUR WIRES) |
| HEAD LAMP | ◯ (FOUR WIRES) | ◯ (FOUR WIRES) | ◯ (FOUR WIRES) |
| NAVIGATION | × | × | ◯ (FOUR WIRES) |

FIG.19

| NAME OF VEHICLE | | SYSTEM | TOTAL | PORTION | 82131 | SPECIFICATION | TOTAL |
|---|---|---|---|---|---|---|---|

CIRCUIT | ROUTE | SUM UP | SETTING

DRAWING | EDITING | DISPLAY

SETTING OF COMPARATIVE DATA

CANCEL

| | NAME OF DRAWING | SYSTEM | PORTION | SPECIFICATION | SELECTION |
|---|---|---|---|---|---|
| 1 | 1 | 1 | TOTAL | 82131 | 1 | ○ |
| 2 | 2 | 1 | TOTAL | 82131 | TOTAL | ○ |
| 3 | 3 | 1 | TOTAL | 82131 | 3 | ○ |
| 4 | 4 | 1 | TOTAL | 82131 | 4 | |
| 5 | 5 | 1 | TOTAL | 82131 | 5 | |
| 6 | A | 1 | TOTAL | 82131 | TOTAL | |
| 7 | A-1 | 1 | TOTAL | 82131 | TOTAL | |
| 8 | A-2 | 1 | TOTAL | 82131 | TOTAL | |
| 9 | A-3 | 1 | TOTAL | 82131 | TOTAL | |
| 10 | AAA | 1 | TOTAL | TOTAL | TOTAL | |

200
500
600
600
100 100
6-2

WIRING HARNESS ARRANGEMENT DESIGNING APPARATUS AND METHOD THEREFOR

BACKGROUND OF THE INVENTION

1. Field of the Invention

The present invention relates to a wiring harness arrangement designing apparatus for designing the arrangement of wiring harnesses within a vehicle by using a wiring diagram and a route drawing, and a method therefor, and relates, more particularly, to a wiring harness arrangement designing apparatus for easily designing the arrangement of wiring harnesses according to a computer aided design (hereinafter referred to as CAD), and a method therefor.

2. Related Art

For arranging wiring harnesses within a vehicle, it has been a conventional practice that, at first, a route drawing for displaying a route of the arrangement of the wiring harnesses is prepared. This route drawing shows at what portions of the vehicle the wiring harnesses are to be disposed in order to confirm interference and space between other parts and the vehicle body in the actual vehicle, and this route drawing is prepared in accordance with graphics.

One example of a route drawing is shown in FIG. 1. On the route drawing shown in FIG. 1, portions indicated by thick lines express wiring harnesses 101. Joints 103 are connected between the wiring harnesses 101.

Within the vehicle, a plurality of auxiliary units such as terminals and connectors are disposed. As the plurality of auxiliary units are connected by a plurality of wires, a wiring diagram is prepared. This wiring diagram is the one for showing circuits of the vehicle, and the wiring diagram expresses only a relationship of connection between the circuits by disregarding the lengths and diameters of the wires.

FIG. 2 shows one example of a wiring diagram. The wiring diagram shown In FIG. 2 expresses the wiring of a head lamp system. A joint 103 is connected to one end of a first head lamp 107a through a first wire 105a, and the other end of the first head lamp 107a is grounded. Also, the joint 103 is connected to one end of a second head lamp 107b through a second wire 105b, and the other end of the second head lamp 107b is grounded.

There is no direct relationship between the wiring diagram and the route drawing thus prepared. Route information does not include any wiring information such as the number of passing wires, diameters of the wires, thickness of each wiring harness (diameter), or destination of each circuit.

Then, by referring to the prepared route drawing shown in FIG. 1 and the prepared wiring diagram shown in FIG. 2, the wires 105a and 105b, the joint 103, the first head lamp 107a and the second head lamp 107b are disposed along the route of the wiring harness 101. As a result, a substantive wiring diagram of a head lamp system is prepared as shown in FIG. 3.

In the above example, the substantive wiring diagram for only the headlamp system has been explained. However, in addition to the head lamp system there are various other kinds of systems mounted on the vehicle, such as an air bag system, an air conditioning system, an engine control system, an ABS system (an anti-lock braking system), etc. It has been a practice that a route drawing and a wiring diagram are prepared for each system, and a substantive wiring diagram is prepared for each system by using the route drawing and the wiring diagram prepared.

Further, the type of a vehicle and wiring information such as the position of a wiring harness have been understood by summing up each information after preparing a drawing of the wiring harness. Further, each type of specification has been extracted from the substantive wiring diagram of each circuit.

However, according to the above-described conventional method, as the wiring diagram and the route drawing are prepared manually for each system, and the substantive wiring diagram is prepared for each system by using the prepared wiring diagram and route drawing, considerable time has been required for this preparation work.

Further, as it is not possible to understand the thickness of a wiring harness on the route by looking at each substantive wiring diagram, a designer has calculated the thickness of the wiring harness based on the designer's experience or intuition judging from the kind of a passing wiring.

Further, when the position of an auxiliary unit has been changed to another position, it has not been possible to easily understand how the wiring arrangement and the thickness of the wiring harness have been changed following this positional change.

Furthermore, as various pieces of information of the wiring harness have been collected or summed up by looking at each substantive wiring diagram, it has taken considerable time for this summing up work.

SUMMARY OF THE INVENTION

It is an object of the present invention to provide a wiring harness arrangement designing apparatus capable of designing an arrangement of wiring harnesses in a short time and reducing the load of a designer, and a method therefor.

In order to achieve the above object, there is provided a wiring harness arrangement designing apparatus comprising: route information inputting means for inputting route information including route drawing Information on routes of a plurality of wiring harnesses to be arranged within a vehicle and route length information of each wiring harness; wiring information memory means for storing wiring information including auxiliary unit information on a plurality of auxiliary units connected to the plurality of wiring harnesses and wire information on attributes of a plurality of wires connected between the plurality of auxiliary units; display means for displaying on a screen a route drawing based on the route information input by the route information inputting means; position assigning means for assigning positions of the plurality of auxiliary units on the route drawing displayed on the screen based on the auxiliary unit information included in the wiring information stored by the wiring information memory means; and route/wiring linking means for mutually wire-connecting the plurality of auxiliary units of which positions have been assigned by the position assigning means through a selective route on the route drawing, and for linking the wiring information on the plurality of wire-connected auxiliary units to the route information on the selected route.

According to the above embodiment, when the route information inputting means has input route information including route drawing information on routes of a plurality of wiring harnesses to be arranged within a vehicle and route length information of each wiring harness, the display means displays on a screen a route drawing based on the route information input by the route information inputting means. When the position assigning means has assigned positions of the plurality of auxiliary units on the route drawing displayed on the screen based on the auxiliary unit information included in the wiring information stored by the wiring information memory means, the route/wiring linking means mutually wire-connects the plurality of auxiliary units of which positions have been assigned by the position assigning means through a selective route on the route drawing, and links the wiring information on the plurality of wire-connected auxiliary units to the route information on the selected route. In other words, as the substantive wiring diagram having the wiring information added to the route information is prepared, it is not necessary to manually prepare the substantive wiring diagram. As a result, it is possible to design the arrangement of the wiring harness in a shorter time, which alleviates the load of the designer.

According to a preferred embodiment of the present invention, the route/wiring linking means wire-connects a pair of auxiliary units to be connected, out of the plurality of auxiliary units assigned by the position assigning means, in a shortest route through at least one route on the route drawing, and generates substantive wiring information having the wiring information linked to the route information.

According to the above embodiment, as the route/wiring linking means wire-connects a pair of auxiliary units to be connected, out of the plurality of auxiliary units assigned by the position assigning means in a shortest route through at least one route on the route drawing, and generates substantive wiring information having the wiring information linked to the route information, it is possible to carry out an efficient designing of the arrangement of the wiring harness.

According to a preferred embodiment of the present invention, the wiring harness arrangement designing apparatus further comprises substantive wiring information memory means for storing the substantive wiring information generated by the route/wiring linking means, and the substantive wiring information memory means stores wire-connection information for showing wire-connection from one auxiliary unit to the other auxiliary unit through at least one route on the route drawing as the substantive wiring information, and also stores the wire information by making the wire information correspond to the wire-connection information.

According to the above embodiment, as the substantive wiring information memory means stores wire-connection information for showing wire-connection from one auxiliary unit to the other auxiliary unit through at least one route on the route drawing as the substantive wiring information, and also stores the wiring information by making this information correspond to the wire-connection information, it is possible to link the route information to the wire information.

According to a preferred embodiment of the present invention, the wiring harness arrangement designing apparatus further comprises route selecting means for selecting any one route from within a plurality of routes on the route drawing displayed on the screen; and summing means for reading out the wire information corresponding to the one route selected by the route selecting means based on the information of said at least one route in the wire-connection information stored in the substantive wiring information memory means and summing up the number of wires based on the read out wire information.

According to the above embodiment, when the route selecting means has selected any one route from within a plurality of routes on the route drawing displayed on the screen, the summing means reads out the wire information corresponding to the one route selected by the route selecting means based on the information of at least one route in the wire-connection information stored in the substantive wiring information memory means, and sums up the number of wires based on the read out wire information. Therefore, it is possible to carry out the designing of the arrangement of the wiring harness in a shorter time, which alleviates the load of the designer.

According to a preferred embodiment of the present invention, the summing means sums up the lengths of wires between auxiliary units based on the information of the length of a wire of each route, the coordinates of a starting point and an ending point of each route the coordinates of a route connection point on a route to which an auxiliary unit is connected, and the length of a wire from the route connection point to the auxiliary unit.

According to the above embodiment, the summing means sums up the lengths of wires between auxiliary units based on the information of the length of a wire of each route, the coordinates of a starting point and an ending point of each route, the coordinates of a route connection point on a route to which an auxiliary unit is connected, and the length of a wire from the route connection point to the auxiliary unit. Therefore it is possible to carry out the designing of the arrangement of the wiring harness in a shorter time, which alleviates the load of the designer.

According to a preferred embodiment of the present invention, the summing means calculates the diameter of the wiring harness based on the number of wires summed up and the diameter of each wire.

According to the above embodiment, as the summing means calculates the diameter of the wiring harness based on the number of wires summed up and the diameter of each wire, it is possible to carry out the designing of the arrangement of the wiring harness in a shorter time, which alleviates the load of the designer.

According to a preferred embodiment of the present invention, the summing means sums up the total number of wires of the whole routes on the route drawing based on the wire-connection Information and the wire information stored in the substantive wiring information memory means.

According to the above embodiment, as the summing means sums up the total number of wires of the whole routes on the route drawing based on the wire-connection information and the wire information stored in the substantive wiring information memory means, it is possible to carry out the designing of the arrangement of the wiring harness In a shorter time, which alleviates the load of the designer.

According to a preferred embodiment of the present invention, the display means displays the wiring information linked to the route information, on the same screen as the screen on which the route drawing based on the route information is displayed.

According to the above embodiment, as the display means displays the wiring information linked to the route information, on the same screen as the screen on which the route drawing based on the route information is displayed, the designer can look at collected various information on the wiring harness while looking at the substantive wiring diagram.

Further, in order to achieve the above object of the invention, there is provided a wiring harness arrangement designing method, comprising: a route information inputting step for inputting route information including route drawing information on routes of a plurality of wiring harnesses to be arranged within a vehicle and route length information of each wiring harness: a storing step for storing in wiring information memory means wiring information including auxiliary unit information on a plurality of auxiliary units connected to the plurality of wiring harnesses and wire information on attributes of a plurality of wires connected between the plurality of auxiliary units: a displaying step for displaying on a screen a route drawing based on the route information input; a position assigning step for assigning positions of the plurality of auxiliary units on the route drawing displayed on the screen based on the auxiliary unit information included in the wiring information stored in the wiring information memory means; and a route/wiring linking step for mutually wire-connecting the plurality of auxiliary units of which positions have been assigned through a selective route on the route drawing, and for linking the wiring information on the plurality of wire-connected auxiliary units to the route information on the selected route.

The nature, principle and utility of the invention will become more apparent from the following detailed description when read in conjunction with the accompanying drawings.

BRIEF DESCRIPTION OF THE DRAWINGS

In the accompanying drawings:

FIG. 5 is a table for showing one example of wiring information stored in a wiring information memory;

FIG. 6 is a table for showing one example of route information stored in a route information memory;

FIG. 7 is a table for showing one example of substantive wiring information stored in a substantive wiring information memory;

FIG. 16 is drawing for showing a summing up of a total number of wires in the whole routes on the wiring diagram;

FIG. 18 is a table for showing information of presence or absence of system equipment for each specification;

FIG. 19 is a drawing for showing one example of a comparison of numbers of wires between specifications;

DETAILED DESCRIPTION OF THE PREFERRED EMBODIMENTS

Embodiments of a wiring harness arrangement designing apparatus and a method therefor according to the present invention will be explained in detail below with reference to drawings.

Figure 1:
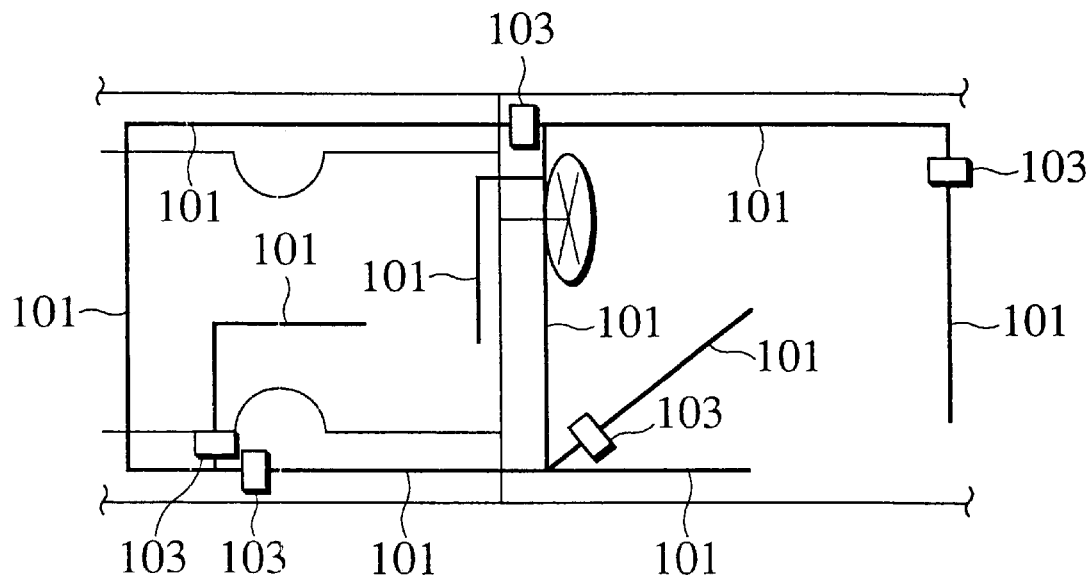
FIG. 1 is a diagram for showing one example of a route drawing.
Figure 2:
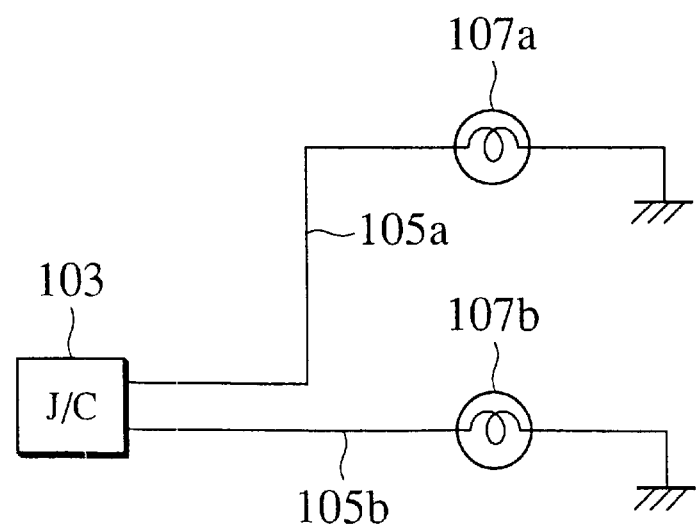
FIG. 2 is a diagram for showing one example of a wiring diagram.
Figure 3:
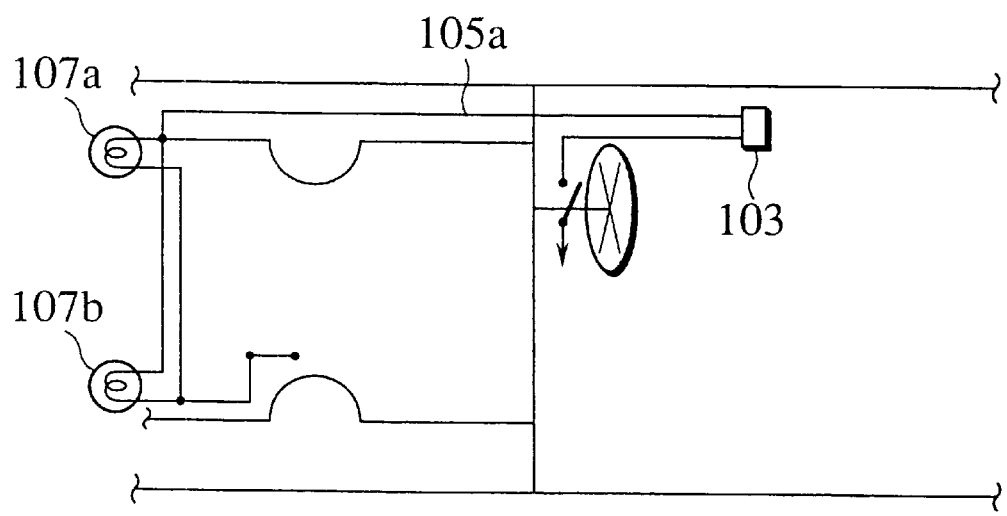
FIG. 3 is a diagram for showing one example of a substantive wiring diagram.
Figure 4:
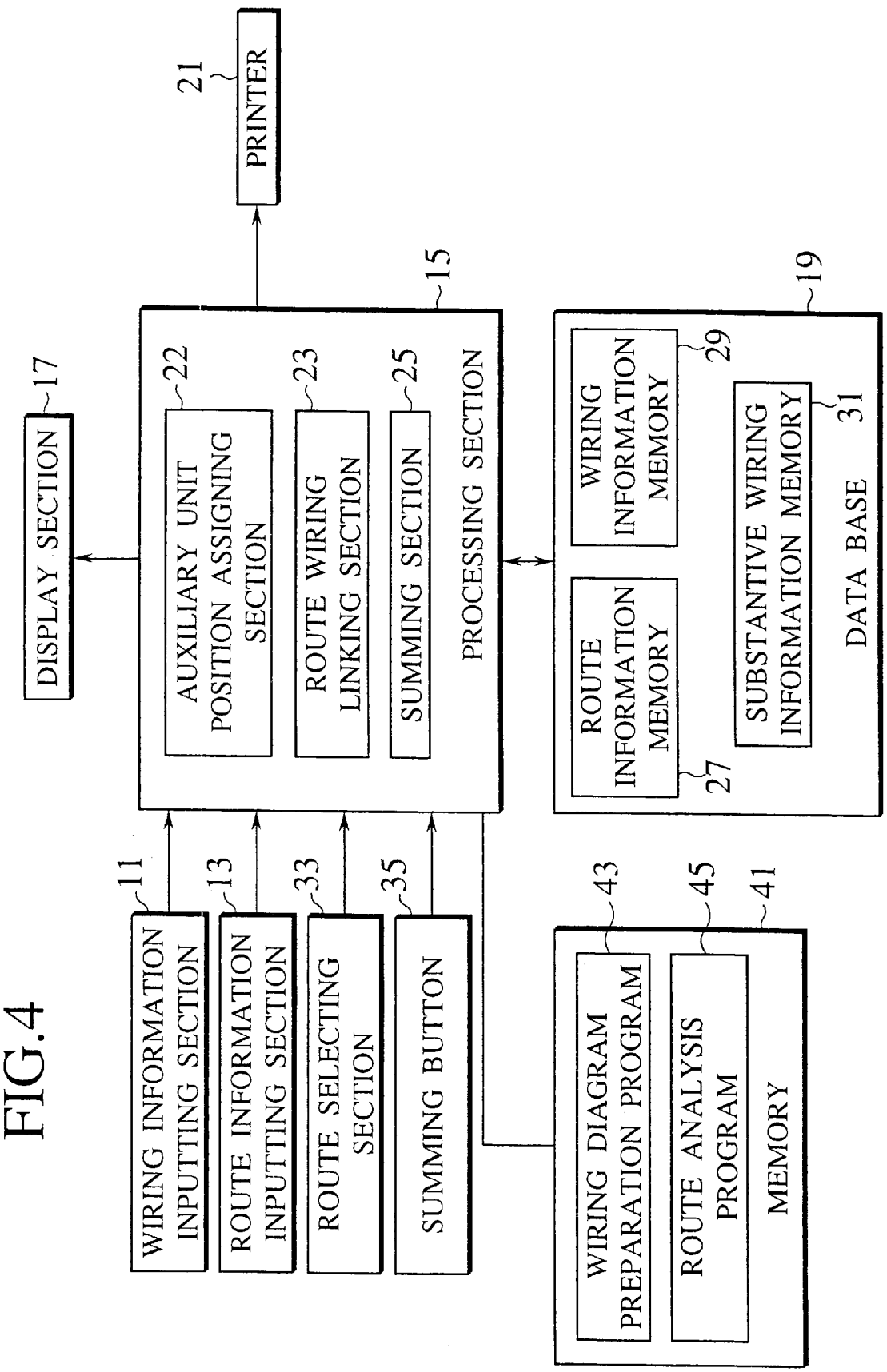
FIG. 4 is a configuration block diagram for showing a wiring harness arrangement designing apparatus according to one embodiment.

FIG. 4 is a configuration block diagram of a wiring harness arrangement designing apparatus according to an embodiment.

The wiring harness arrangement designing apparatus Includes a wiring information inputting section 11, a route information inputting section 13, a processing section 15, a display section 17, a data base 19, and a printer 21. The processing section 15 includes an auxiliary unit position assigning section 22 as position assigning means, a route/wiring linking section 23 as route/wiring linking means, and summing section 25.

The data base 19 includes a route information memory 27, a wiring information memory 29, and a substantive wiring information memory 31. Further, the wiring harness arrangement designing apparatus includes a route selecting section 33, a summing button 35, and a memory 41.

The memory 41 stores a wiring diagram preparation program 43 used for preparing a wiring diagram, and a route analysis program 45 used for preparing a route drawing of a wiring harness.

The wiring information inputting section 11 is for inputting wiring information. The wiring information inputting section 11 inputs wiring information on a screen of the display section 17 with a keyboard, a mouse and the like, for example. The wiring information includes, for example, auxiliary unit information on a plurality of auxiliary units (such as an ABS, a lamp, an electronic control unit (ECU). etc.) to be connected to a wiring harness, terminal information on a plurality of terminals of the plurality of auxiliary units, wire information on attributes (a kind of wire, a wire diameter, color, etc.) of a plurality of wires to be connected between the plurality of auxiliary units, etc.

Further, as the wiring information, there may be stored information of a name of a vehicle, a name of a system, a name of a From-auxiliary unit, a circuit symbol, a name of a terminal, a name of a To-auxiliary unit, a name of a terminal, a set of drawing passing points coordinates, etc.

The route information inputting section 13 is for inputting route information on a route of a wiring harness to be arranged within a vehicle. The route information inputting section 13 inputs route information on the screen of the display section 17 with a keyboard, a mouse, or the like, for example. The route information, includes, for example, passing point information on a plurality of passing points through which a plurality of wiring harnesses to be arranged within a vehicle pass, route drawing information on a route of each wiring harness, wire length information on a wire length of each wiring harness, etc.

Further, as the route information, there may be stored information of a name of a vehicle, a name of a route drawing, coordinates of a starting point and an ending point of a route, a name of a wiring harness, etc.

The processing section 15 is a central processing unit (CPU) or the like. The processing section 15 makes the wiring information memory 29 store the wiring information input by the wiring information inputting section 11, and makes the display section 17 display the wiring information stored in the wiring information memory 29. Further, the processing section 15 makes the display section 17 display the route information input by the route information inputting section 13, and makes the route information memory 27 store the route information input.

The route information memory 27 stores the route information. The wiring information memory 29 stores the wiring information. The display section 17 displays a route drawing based on the route information or displays the wiring information, on the screen.

When the route drawing based on the route information is being displayed on the screen of the display section 17, the auxiliary unit position assigning section 22 reads out the wiring information stored in the wiring information memory 29, and assigns positions of a plurality of auxiliary units on the route drawing displayed on the screen based on the auxiliary unit information among the wiring information read out.

The route/wiring linking section 23 wire-connects a pair of auxiliary units to be connected out of the plurality of auxiliary units assigned by the auxiliary unit position assigning section 22, in a shortest route through passing points and routes on the route drawing, and generates substantive wiring information having the wiring information linked with the route information.

The substantive wiring information memory 31 stores substantive wiring information prepared by the route/wiring linking section 23. As the auxiliary unit information of the substantive wiring information, there may be stored information of a name of a route drawing, coordinates of a drawing, coordinates of a connection point of a basic route, a length of a connection point of the basic route, a take-out length of a wire, etc.

The route selecting section 33 is for selecting any one route out of a plurality of routes on the route drawing displayed on the screen. The route selecting section 33 selects a route with a mouse, for example. The summing button 35 is manipulated for summing up the wires on the whole routes on the route drawing displayed on the screen.

When a route has been selected by the route selecting section 33, the summing section 25 reads out wire information corresponding to the selected route from among the substantive wiring information stored in the substantive wiring information memory 31, and makes the display section 17 display wire information on a wire passing through the selected route.

Further, when the summing button 35 has been manipulated, the summing section 25 sums up the number of wires passing through the whole routes on the route drawing, based on the substantive wiring information stored in the substantive wiring information memory 31, and makes the display section 17 display the whole wire information and summing up information.

Figure 8:
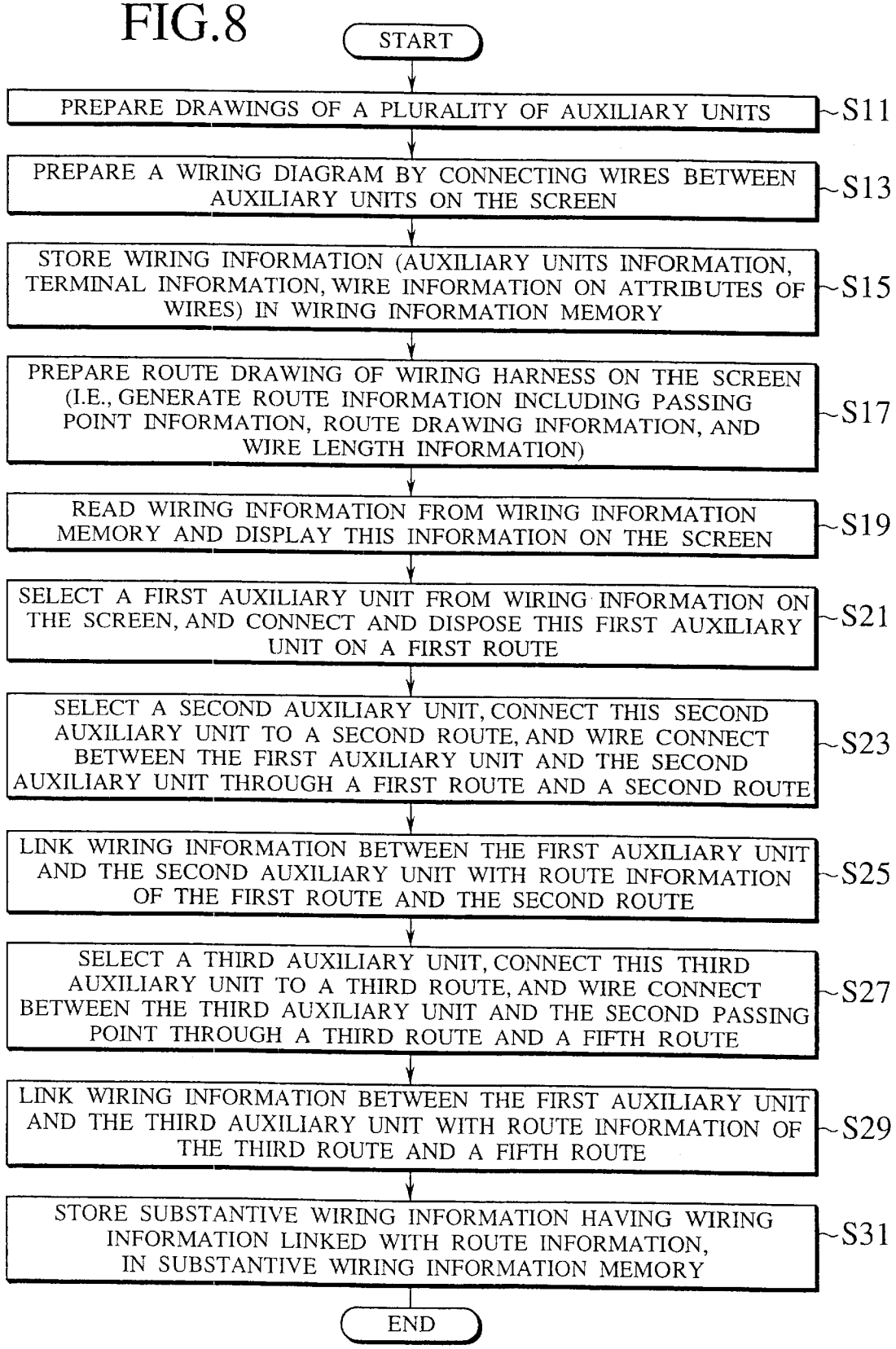
FIG. 8 is a flowchart of a link processing between the route drawing and the wiring diagram of the wiring harness arrangement designing apparatus according to the embodiment.

Next, the linking processing of a linking between the route drawing and the wiring diagram of the wiring harness arrangement designing apparatus of the embodiment having the above-described structure will be explained in detail next with reference to a flowchart shown in FIG. 8. Here, an explanation will be made of a case where a substantive wiring diagram in one system, for example, an ABS system, is prepared by CAD.

At first, by manipulating the mouse or the like, a drawing of a plurality of auxiliary units is prepared on the screen of the display section 17 (step S11). Next, by manipulating the mouse and the keyboard, the plurality of auxiliary units prepared on the screen are connected with wire, thereby to prepare a wiring diagram (step S13).

Figure 9:
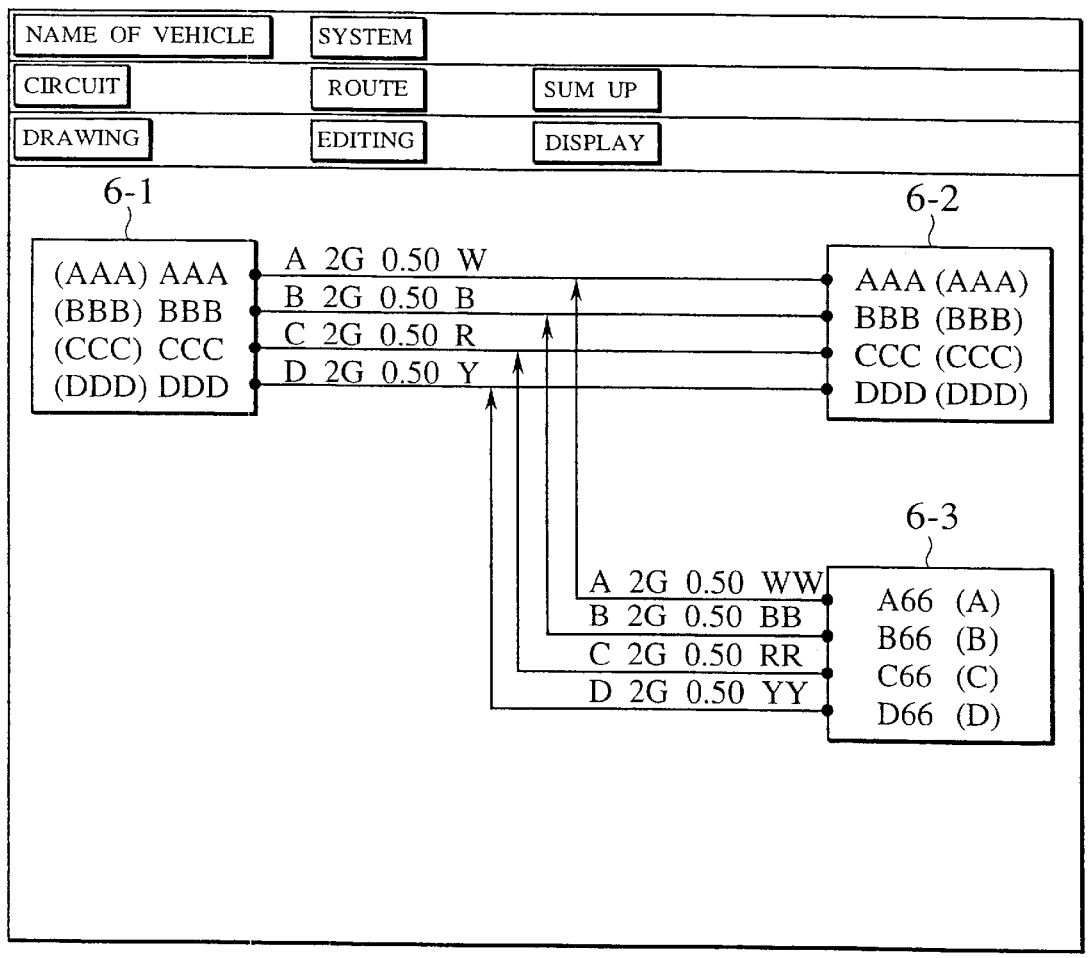
FIG. 9 is a diagram for showing one example of a wiring diagram prepared on the screen.

In preparing the wiring diagram on the screen, as shown in FIG. 9, for example, terminal information AAA, BBB, CCC and DDD is input to each terminal of a first auxiliary unit 6-1 and a second auxiliary unit 6-2 prepared respectively. Then, the corresponding terminals between the first auxiliary unit 6-1 and the second auxiliary unit 6-2 are connected with each line (corresponding to a wire), and attributes of a kind of wire (2G), a diameter of a wire (0.50) and color (white W, blue B, red R and yellow Y) are input for each line of A, B, C and D.

Further, terminal information (A), (B), (C) and (D) is input to respective terminals of a third auxiliary unit 6-3. and each terminal of the third auxiliary unit 6-3 is connected to each line between the first auxiliary unit 6-1 and the second auxiliary unit 6-2 with a corresponding line. Then, attributes of a kind of a wire (2G), a diameter of a wire (0.50) and color (white WW, blue BB, red RR, and yellow YY) are input for each line of A, B, C and D.

Then, the processing section 15 makes the wiring information memory 29 within the data base 19 store the wiring information including the auxiliary unit information, the terminal information and the wire information on the attributes of the wires prepared on the screen (step S15).

FIG. 5 shows one example of the wiring information stored in the wiring information memory. As shown in FIG. 5, the terminal information AAA, BBB, CCC and DDD, and the wire information (a kind of a wire 2G, a diameter of a wire 0.50, colors W, B, R and Y) are stored corresponding to the auxiliary unit information (expressed by 6-1 to 6-2) between the first auxiliary unit 6-1 and the second auxiliary unit 6-2. Further, the terminal information A, B, C and D, and the wire information (a kind of a wire 2G, a diameter of a wire 0.50, colors WW, BB, RR and YY) are stored corresponding to the auxiliary unit information (expressed by 6-3 to (6-1, 6-2)) between the third auxiliary unit 6-3, the first auxiliary unit 6-1 and the second auxiliary unit 6-2.

Next, a route drawing of a wiring harness is prepared on the screen (step S17). Specifically, the route information including the passing point information of a plurality of wiring harnesses, the route drawing information and the wire length information is prepared.

Figure 10:
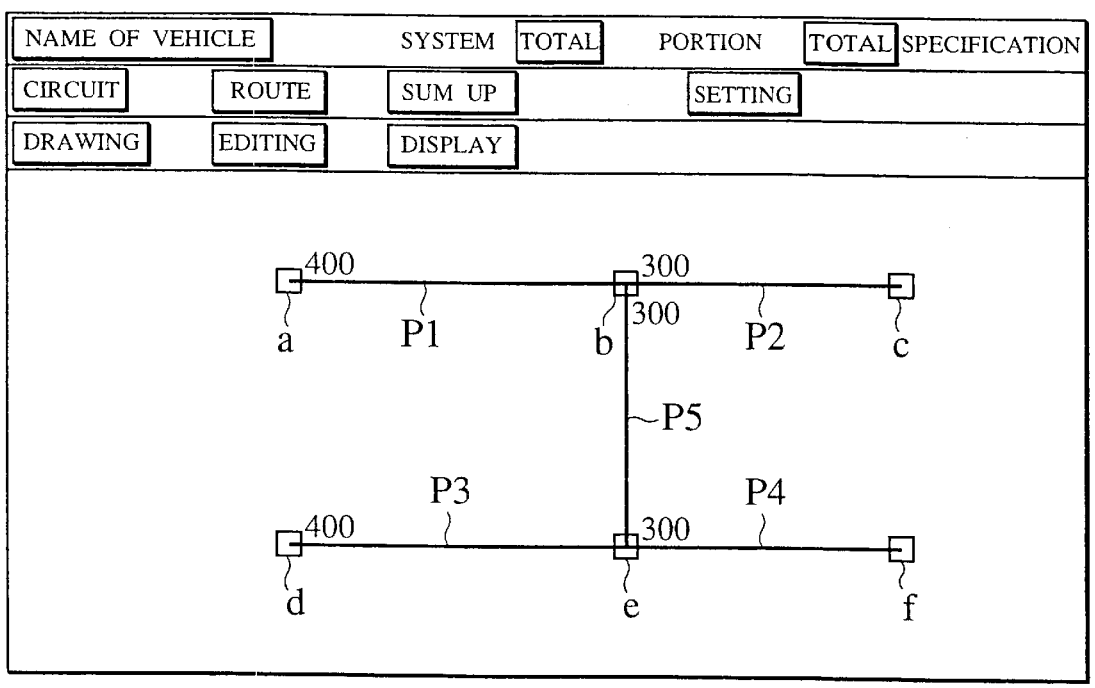
FIG. 10 is a diagram for showing one example of a route drawing prepared on the screen.

FIG. 10 shows one example of a route drawing prepared on the screen The route information according to the route drawing shown in FIG. 10 is prepared as follows. At first, passing points a, b, c, d, e and f for a plurality of wiring harnesses are set on the screen.

Next, the passing point a and the passing point b are connected with a first route (corresponding to the drawing information) P1, and a wire length is input as 400. The passing point b and the passing point a are connected with a second route P2, and a wire length is input as 300. The passing point d and the passing point e are connected with a third route P3, and a wire length is input as 400. The passing point e and the passing point f are connected with a fourth route P4, and a wire length is input as 300. Then, the passing point b and the passing point e are connected with a fifth route P5. and a wire length is input as 300. Thus, a route drawing based on the route information is prepared.

The route information on the route drawing in this case is stored in the route information memory 27. FIG. 6 shows one example of the route information. As shown in FIG. 6, the route information is stored as each information of a passing point, a route and a length of a wiring harness.

Figure 11:
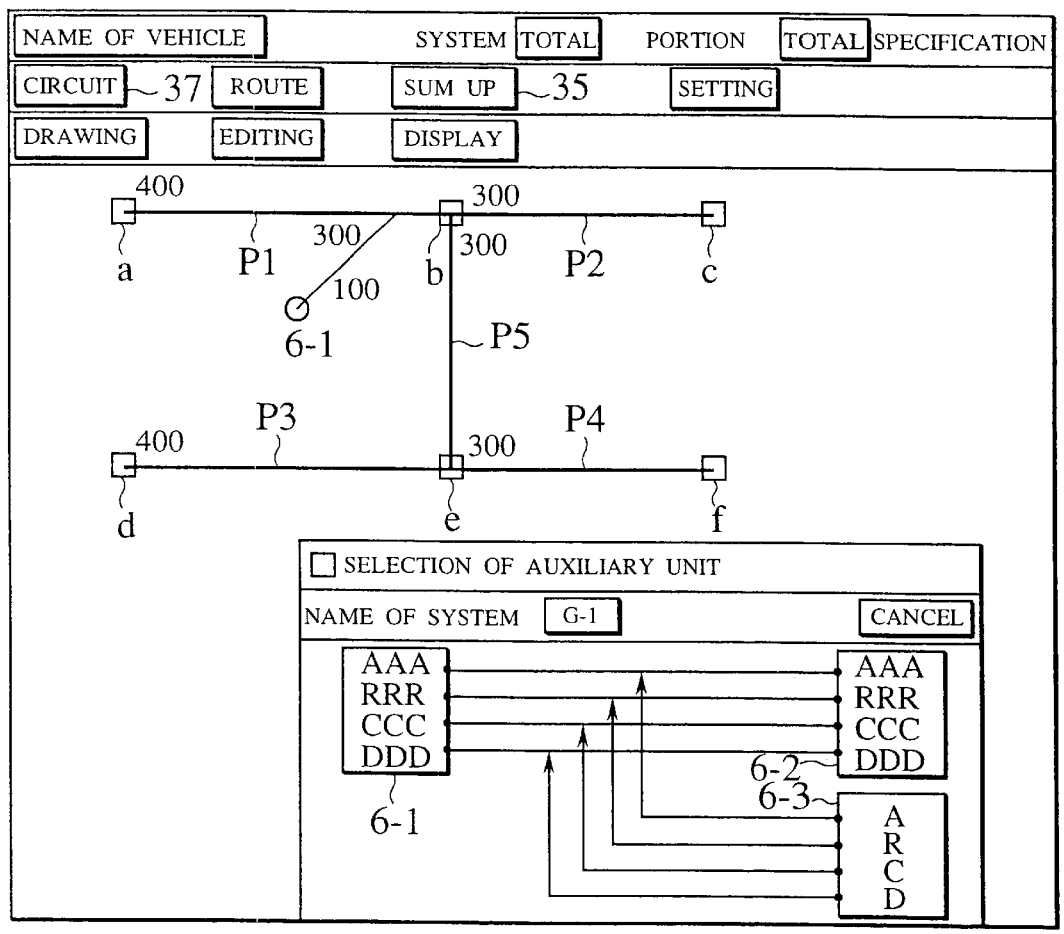
FIG. 11 is a diagram for showing a status having a first auxiliary unit disposed on the route drawing.

When a circuit button 37 is clicked while the route drawing is being displayed on the screen, the auxiliary unit position assigning section 22 reads out the wiring information from the wiring information memory 29 and makes the wiring information displayed on the screen (step S19). For example, as shown in FIG. 11, there are displayed on the screen the first auxiliary unit 6-1, the second auxiliary unit 6-2, the third auxiliary unit 6-3, and the lines connecting between these auxiliary units.

Then, after the first auxiliary unit 6-1 has been selected from the wiring information on the screen by clicking this auxiliary unit 6-1, any position of the first route P1 is clicked with the mouse, and from the keyboard, a length of a wiring harness is input as 300 at a lower part of this clicked position. Then a line of a predetermined length is drawn in a diagonally lower direction from this clicked position, and a line length is input as 100. The first auxiliary unit 6-1 is disposed at the front end position of the line (step S21).

Figure 12:
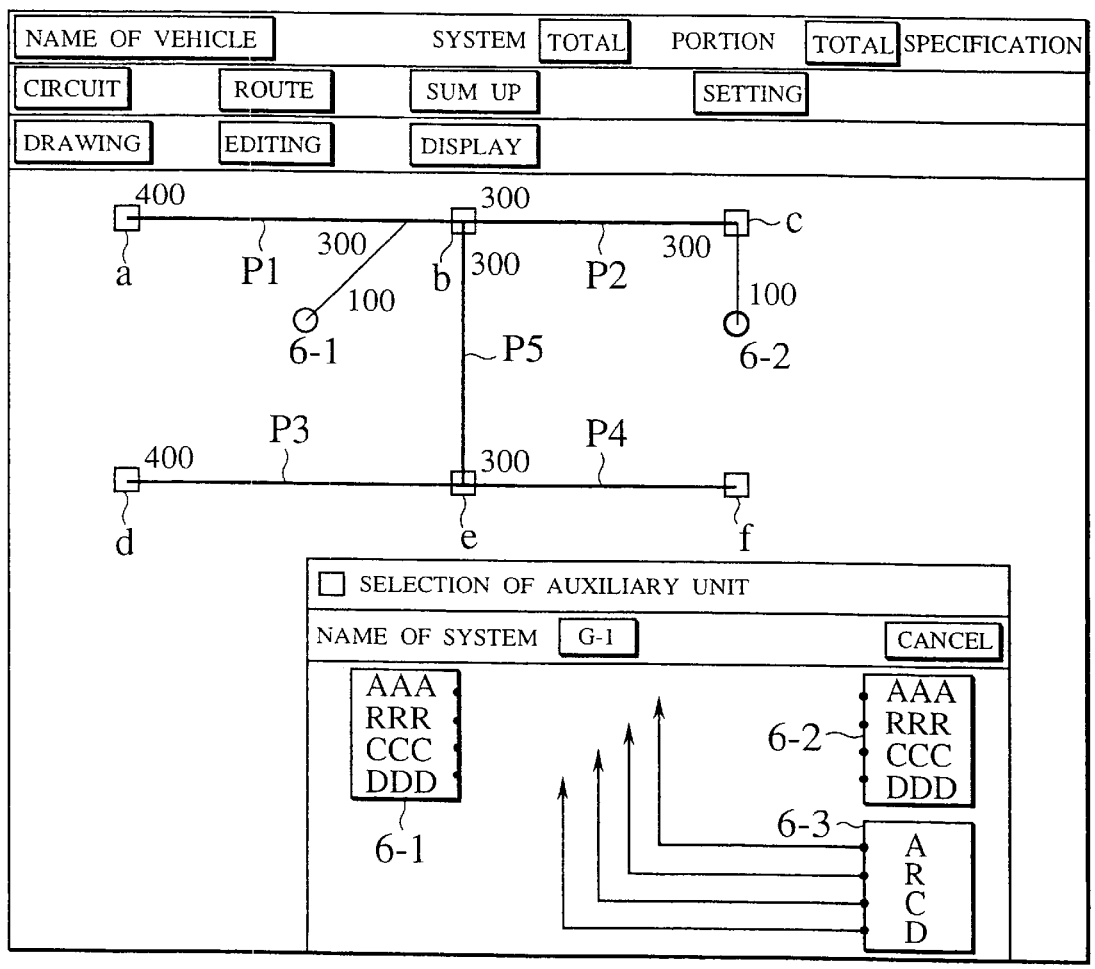
FIG. 12 is a diagram for showing a status having wire-connected between the first auxiliary unit and a second auxiliary unit, with the second auxiliary unit disposed on the route drawing.

Next, as shown in FIG. 12, after the second auxiliary unit 6-2 has been selected from the wiring information on the screen by clicking this auxiliary unit 6-2, the right end of the second route P2 (the third passing point c) is clicked with the mouse, and from the keyboard, a length of a wiring harness is input as 300 at a lower part of this right end position. Then, a line of a predetermined length is drawn in a vertically downward direction from this right end position, and a line length is input as 100. The second auxiliary unit 6-2 is disposed at the front end position of the line.

Then, the route/wiring linking section 23 wire-connects between the pair of auxiliary units 6-1 and 6-2 of which positions have been assigned by the auxiliary unit position assigning section 22, in a shortest route through the passing points and routes on the route drawing. In this example, the first auxiliary unit 6-1 is wire-connected to the second auxiliary unit 6-2 through the first route P1 and the second route P2 (step S23). Then, the wiring connection route between the first auxiliary unit 6-1 and the second auxiliary unit 6-2 is discriminatingly displayed, for example, by a green line.

In the wire-connection between the first auxiliary unit 6-1 and the second auxiliary unit 6-2, a shortest route is selected to make minimum the length of the wire between the first auxiliary unit 6-1 and the second auxiliary unit 6-2. In other words, when there exist a plurality of wiring routes from one auxiliary unit to the other auxiliary unit; a wire length from the one auxiliary unit to the other auxiliary unit is calculated for each wiring route, and the wiring route having the shortest wire length is selected from among the plurality of wire lengths calculated. In this case, wiring routes for disposing joints, connectors and the like between the auxiliary units are excluded from an optimum wiring route.

In the case of the example shown in FIG. 12, as only one wiring route exists between the first auxiliary unit 6-1 and the second auxiliary unit 6-2, the first auxiliary unit 6-1 is wire-connected to the second auxiliary unit 6-2 through the first route P1 and the second route P2. The sum of the values of wire lengths on the wiring route becomes as follows.

$$100+(400-300)+300+100=600$$

Then, the route/wiring linking section 23 links the wiring information of the wiring between the first auxiliary unit 6-1 and the second auxiliary unit 6-2 with the route information of the first route P1 and the second route P2 (step S25).

Figure 13:
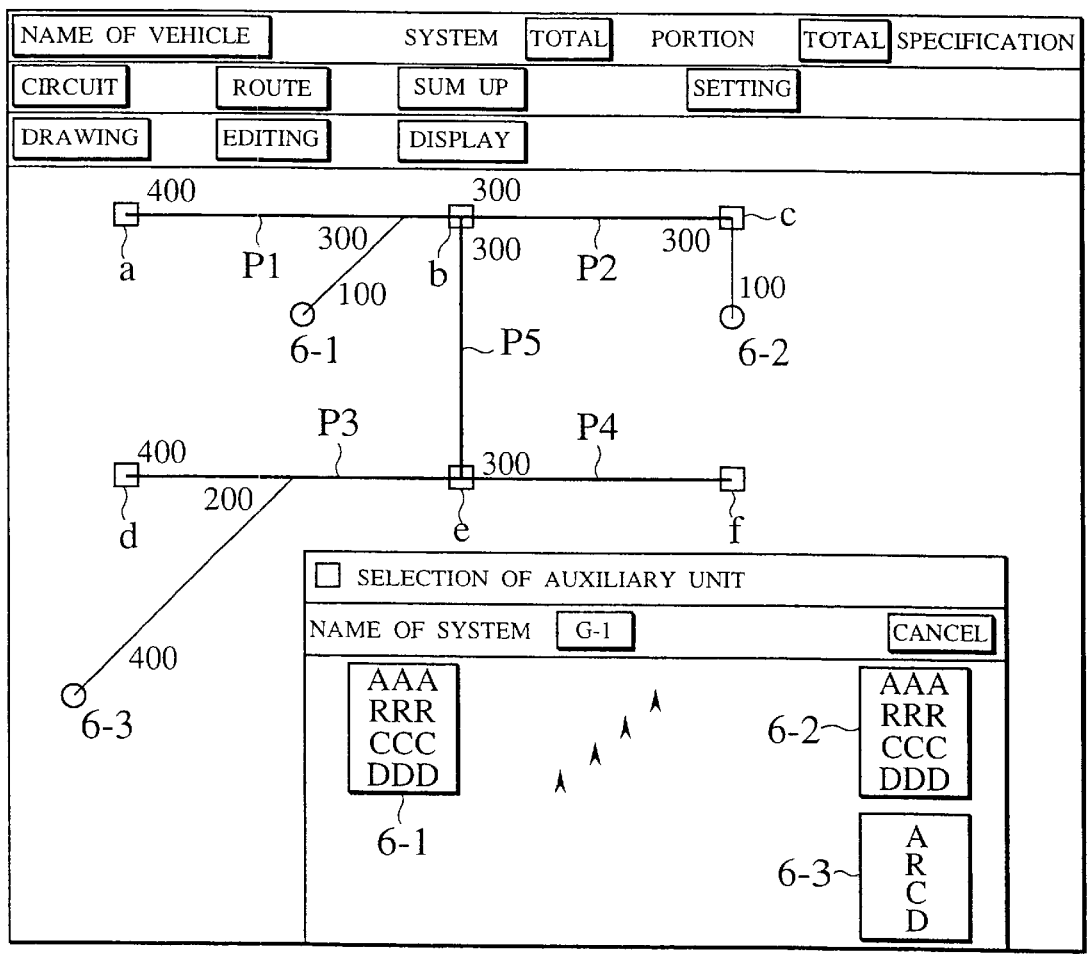
FIG. 13 is a diagram for showing a status having wire-connected between a third auxiliary unit and a second passing point, with the third auxiliary unit disposed on the route.

Next, as shown in FIG. 13, after the third auxiliary unit 6-3 has been selected from the wiring information on the screen by clicking this auxiliary unit 6-3, any position of the third route P3 is clicked with the mouse, and from the keyboard, a length of a wiring harness is input as 200 at a lower part of this clicked position. Then a line of a predetermined length is drawn in a diagonally lower direction from this clicked position, and a line length is input as 400. The third auxiliary unit 6-3 is disposed at the front end position of the line.

Then, the route/wiring linking section 23 wire-connects between the third auxiliary unit 6-3, the first auxiliary unit 6-1 and the second auxiliary unit 6-2 of which positions have been assigned, in a shortest route through the passing points and routes on the route drawing.

In this example, the third auxiliary unit 6-3 is wire-connected to the second passing point b through the third route P3 and the fifth route P5 (step S27). Then, the wiring connection route between the third auxiliary unit 6-3 and the second passing point b is discriminatingly displayed, for example, by a green line. In other words, as the third auxiliary unit 6-3 is wire-connected to the second passing point b, the third auxiliary unit 6-3 is wire-connected to the first auxiliary unit 6-1 and the second auxiliary unit 6-2. The sum of the values of wire lengths on the wiring route becomes as follows.

$$400+(400-200)+300=900$$

Then, the route/wiring linking section 23 links the wiring information of the wiring between the first auxiliary unit 6-1 and the third auxiliary unit 6-3 with the route information of the third route P3 and the fifth route P5 (step S29).

Lastly, the route/wiring linking section 23 makes the substantive wiring information memory 31 store the substantive wiring information having the wiring information linked with the route information (step S31).

FIG. 7 shows the substantive wiring information stored in the substantive wiring information memory 31. The substantive wiring information shown In FIG. 7 consists of the wiring connection Information (6-1 to P1 to P2 to 6-2) that expresses the wiring connection from the first auxiliary unit 6-1 to the second auxiliary unit 6-2 through the first route P1 and the second route P2, the total length of the wires in this case (600) and the wire information (a kind of a wire, a diameter of a wire, color), and the wiring connection information (6-3 to P3 to P5 to b) that expresses the wiring connection from the third auxiliary unit 6-3 to the second passing point b through the third route P3 and the fifth route P5, the total length of the wires in this case (900) and the wire information (a kind of a wire, a diameter of a wire, color).

Next, when any route on the route drawing, for example, the second route P2, is clicked, the route/wiring linking section 23 reads out the wire information corresponding to the second route P2 from the substantive wiring information stored in the substantive wiring information memory 31, and make this wire information displayed on the screen. Accordingly, it is possible to easily understand the attributes of the wires passing through the second route P2 and the total number of wires.

Similarly, when any route on the route drawing, for example, the fifth route P5, is clicked, the route/wiring linking section 23 reads out the wire information corresponding to the fifth route P5 from the substantive wiring information stored in the substantive wiring information memory 31, and make this wire information displayed on the screen. Accordingly, it is possible to easily understand the attributes of the wires passing through the fifth route P5 and the total number of wires.

In the above explanation, the description has been made of the case where the substantive wiring diagram in the ABS system is prepared by CAD. However, in addition to the ABS system, there are various other kinds of systems mounted on the vehicle, such as, for example, a lamp system, an engine control system, an air-conditioning system, etc., and one substantive wiring diagram is prepared by integrating these systems. It is also possible to have the prepared one substantive wiring diagram printed by the printer 21.

As explained above, the substantive wiring diagram having the wire information linked with the route information is prepared as an integrated substantive wiring diagram incorporating a plurality of systems, by the route/wiring linking section 23. Accordingly, it is not necessary to manually prepare a plurality of substantive wiring diagrams. Further, as the substantive wiring diagram can be prepared by CAD, it is possible to design a wiring harness arrangement in a short time.

Further, as the wiring information is linked with the route information, it is possible to easily understand the wire information of the wires on the route drawing in a short time. Furthermore, as the total length of wires between the auxiliary units is calculated as the shortest route, it is possible to minimize the total length of wires, thereby to substantially reduce the cost of wires.

Next, various processing of the summing section in the wiring harness arrangement designing apparatus will be explained in detail below.

Figure 14:
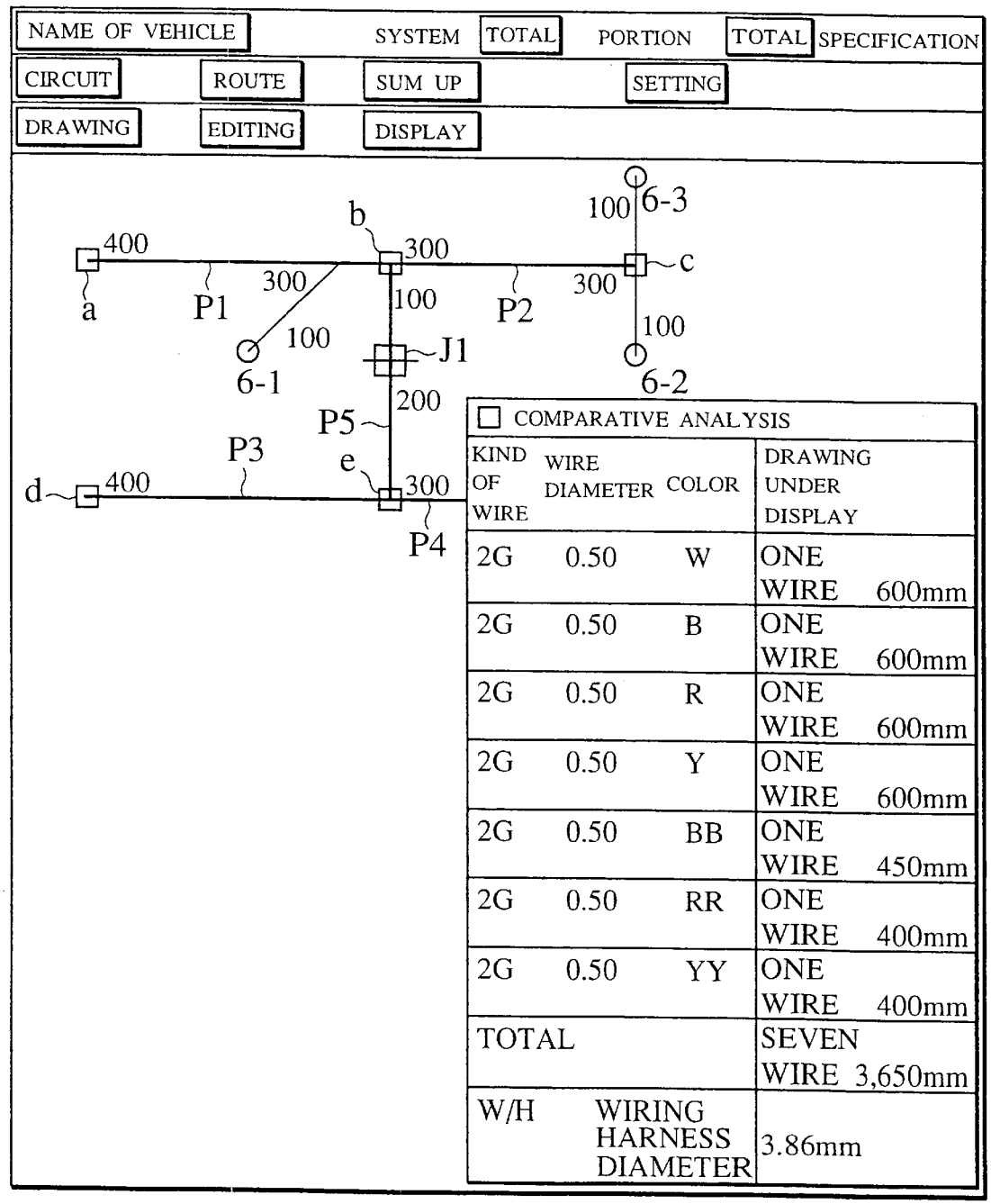
FIG. 14 is a drawing for showing numbers of wires passing through a second route and a diameter of a wiring harness.

At first, the position of the third auxiliary unit 6-3 on the route drawing shown in FIG. 13 will be transferred to a position shown in FIG. 14. More specifically, a line of a predetermined length is drawn in the above direction from the right end position of the second route P2, and a line length is input as 100. The third auxiliary unit 6-3 is disposed at the front end of this line.

Then, the route/wiring linking section 23 wire-connects between the third auxiliary unit 6-3 of which position has been changed and, a joint J1 through the passing points and routes on the route drawing, in a shortest route. Specifically, there is selected a wiring route of the third auxiliary unit 6-3. the second route P2, the fifth route P5, and the joint J1.

Then, the wiring connection information of this case (6-3 to P2 to P5 to J), the wire length and the wire information (in this case, wire information of three wires) are stored in the substantive wiring information memory 31.

Next, in order to calculate the total number of wires passing through the second route P2 and the diameter of the wiring harness, the second route P2 is clicked and the summing button 35 is clicked. Then, the summing section 25 reads out the wire information corresponding to the second route P2 by referring to the wiring connection information in the substantive wiring information memory 31, and displays this wire information.

Specifically, of the wire information displayed on the screen, the wire information for the four wires from the top of the list is first wire information based on P2 of the wiring connection information (6-1 to P1 to P2 to 6-2), and the wire information for the three wires below the above four wires is second wire information based on P2 of the wiring connection information (6-3 to P2 to P5 to J).

Further, the summing section 25 calculates the total number of wires (seven) which is the sum of the total number of wires (four) of the first wire information and the total number of wires (three) of the second wire information, calculates the total length of the wires (3,650 mm), calculates the diameter of the wiring harness (3.86 mm) from the total value (3.75 mm) of the diameters of the wires, and displays these calculated values.

Accordingly, it is possible to easily calculate the total number of wires passing through an optional route and the diameter of the wiring harness. Thus, this facilitates the designing of the arrangement of wiring harnesses. Further, when a position of an auxiliary unit is changed to another position, the total number of wires and the diameter of the wiring harness are also changed following this positional change. Therefore, it is not necessary for the designer to calculate the diameter of the wiring harness, thereby to reduce the work load of the designer.

Figure 15:
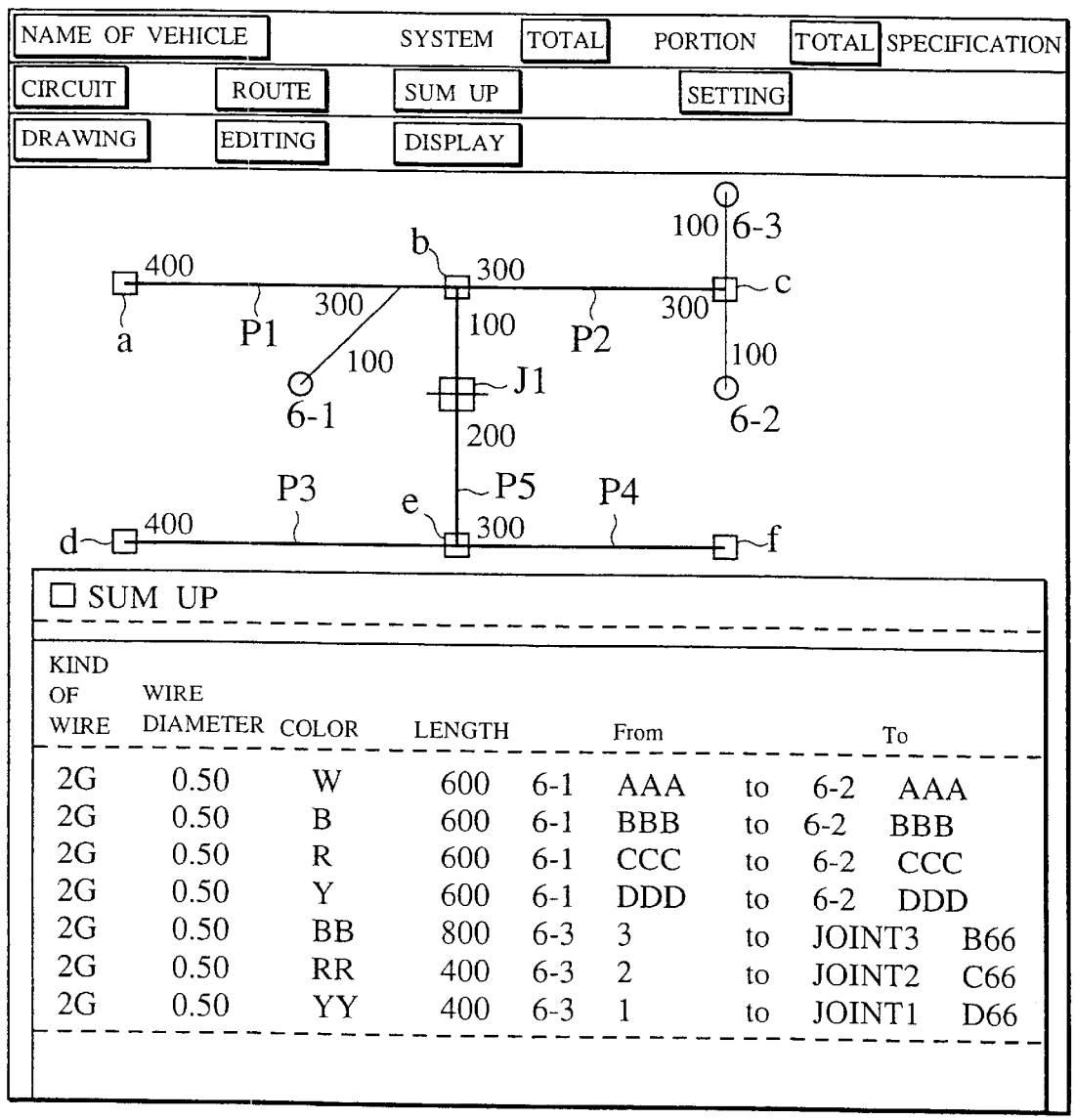
FIG. 15 is a drawing for showing a circuit list of passing wires on any route.

Further, based on the substantive wiring information in the substantive wiring information memory 31, the summing section 25 can also read out wire information (a kind of a wire, a diameter of a wire, color), a wire length. wire destination information of 6-1 (From) and 6-2 (To) among the wiring connection information (6-1 to P1 to P2 to 6-2), and wire destination information of 6-3 (From) and the joint (To) among the wiring connection information (6-3 to P2 to P5 to J), and then can display this read-out information on the screen as shown in FIG. 15. As the circuit list of the passing wires on an any route is displayed on the screen, it is possible to easily understand the total number of wires and the destination of the wires.

Further, when the summing button 35 is clicked, the summing section 25 can also sum up the total numbers of wires in the whole routes on the route drawing, by referring to the substantive wiring information stored in the substantive wiring information memory 31, and then can display the result as shown in FIG. 16.

Figure 17:
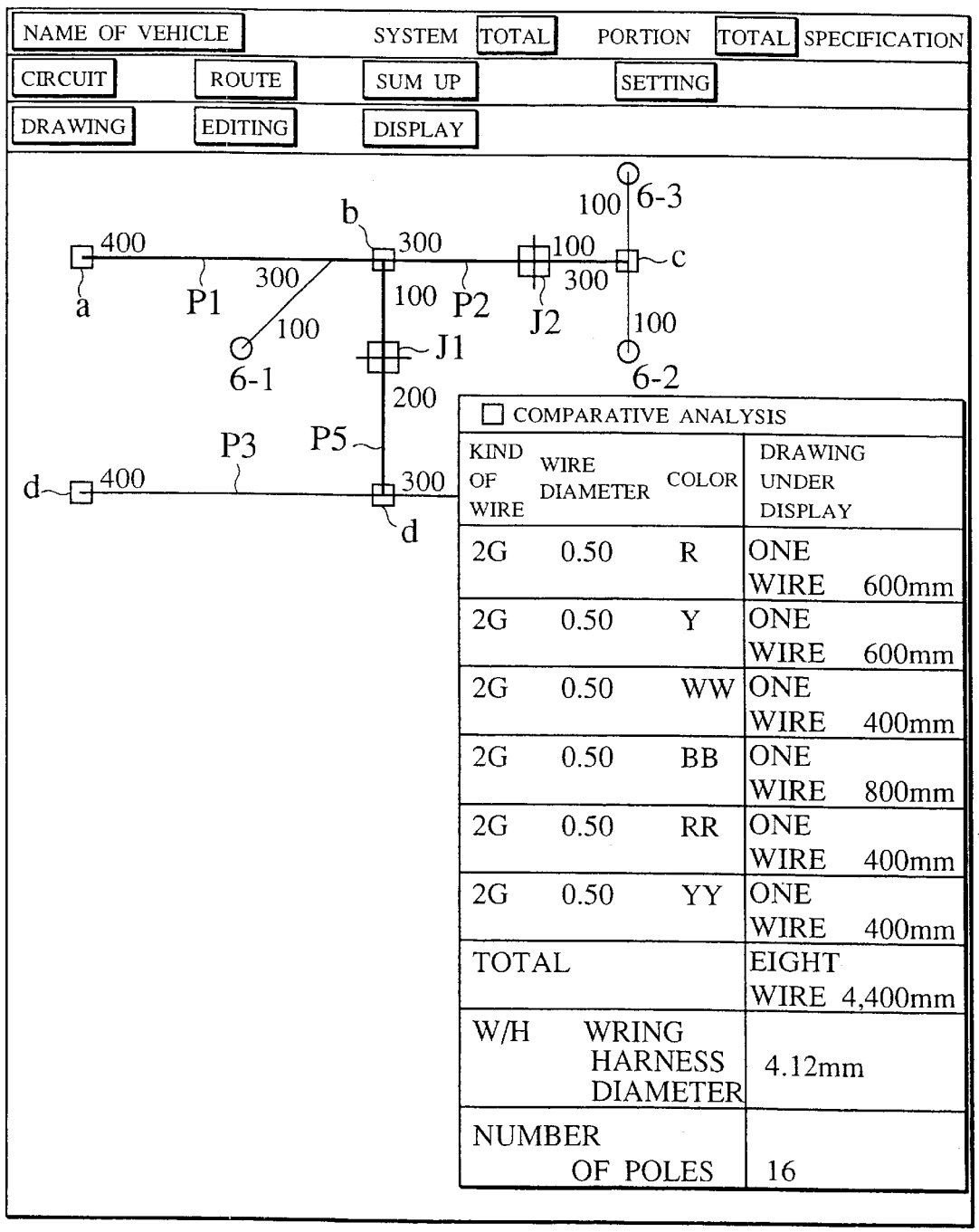
FIG. 17 is a drawing for showing a total number of poles of terminals of joints, a total number of wires and diameters of wiring harnesses calculated.

Further, as shown in FIG. 17, when there are disposed on the route drawing a joint J1 (four poles of terminal pins at the upper side of the joint and four poles of terminal pins at the lower side of the joint) on the fifth route P5 and a joint J2 (eight poles of terminal pins at the left side of the joint and eight poles of terminal pins at the right side of the joint) on the second route P2, the substantive wiring information memory 31 stores the terminal pole number information of the joint J1 and the terminal pole number information of the joint J2 corresponding to the wire information.

Then, when the joint 32 on the route drawing, for example, is clicked, the summing section 25 can also read out the joint J2 terminal pole number information corresponding to the joint J2 and the wire information from the substantive wiring information memory 31. calculate the total number of the terminal poles of the joint J2 and the diameter of the wiring harness, and make a display as shown in FIG. 17. From this display, it is possible to understand that the total pole number of the joint J2 is 16 pins (8 pins plus 8 pins), and the total number of poles from the wires to the wires at the joint J2 is 16 pins.

Further, the summing section 25 can also sum up the wire information for each specification. For example, it is assumed that, as shown in FIG. 18, the data base 19 stores the system equipment information for showing equipment (○) or non-equipment (×) of each system of the ABS system, the head lamp system and the navigation system in each vehicle of the standard class (STD), the intermediate class (OPT) and the high class (MAX), and that the data base 19 stores the wire information of each system for class of vehicle.

Then, the summing section 25 can calculate the total number of wires for each class of vehicle, by referring to the system equipment information and the wire information for each system by class of vehicle stored in the data base 19. For example, when the high class is selected, the high class vehicle is equipped with the ABS system, the head lamp system and the navigation system. Therefore, when each system requires four wires, a total 12 wires are necessary. Further, by a similar method, the summing section 25 can also sum up the wire information for each wiring harness.

Further, the summing section 25 can also calculate a difference between the numbers of wires by comparing the numbers of wires between the classes of vehicle, by referring to the system equipment information and the wire information for each system by class of vehicle stored in the data base 19. For example, in the case of comparing the high class vehicle with the standard-class vehicle, the high class and the standard class are selected.

By calculating the total number of wires of the high class (12 wires) and the total number of wires of the standard class (4 wires), it is possible to calculate the difference of wires (8 wires) between the two classes of vehicle. In the similar manner, it is also possible to compare the total number of wires between specifications.

FIG. 19 shows one example of a comparison of the number of wires between specifications. The example shown in FIG. 19 shows a status that the specification 3 is being selected in the case of comparing the number of wires between the specification 1 (corresponding to STD) and the specification 3 (corresponding to MAX) when a target portion of wiring harness is "82131" and the total system is considered.

Figure 20:
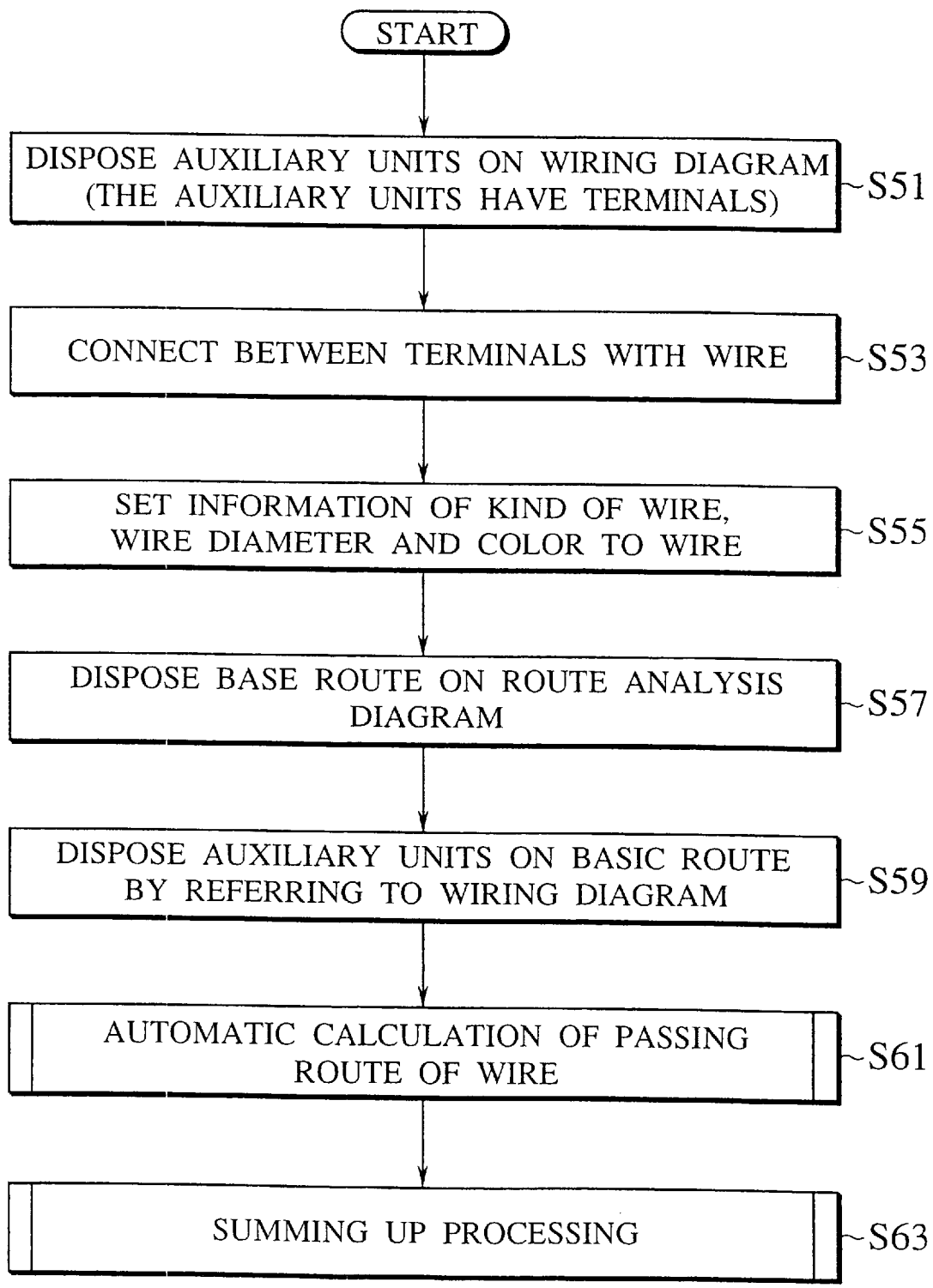
FIG. 20 is a flowchart for showing a basic processing of a method of designing a wiring harness arrangement.

Next, a basic processing of a method of designing the arrangement of wiring harnesses will be explained with reference to a flowchart shown in FIG. 20.

At first, a plurality of auxiliary units are disposed on the wiring diagram on the screen (step S51). A terminal of one auxiliary unit is connected to a terminal of another auxiliary unit with a wire (step S53). Information of a kind of the wire, a diameter of the wire and color is set to the wire (step S55). With this arrangement, a wiring diagram is prepared.

Next, a basic route of the wiring harness is disposed on a route analysis diagram on the screen (step S57). Thus, a route drawing is prepared.

Further, by referring to the wiring diagram prepared, the auxiliary units a redisposed on the basic route (step S59). Then, wire passing routes are calculated automatically (step S61). With this arrangement, a substantive wiring diagram is prepared.

By carrying out the processing from the step S51 to the step S61, information for summing up the wires is set. Thus, the total length of wires between the auxiliary units and others are summed up (step S63).

Figure 21:
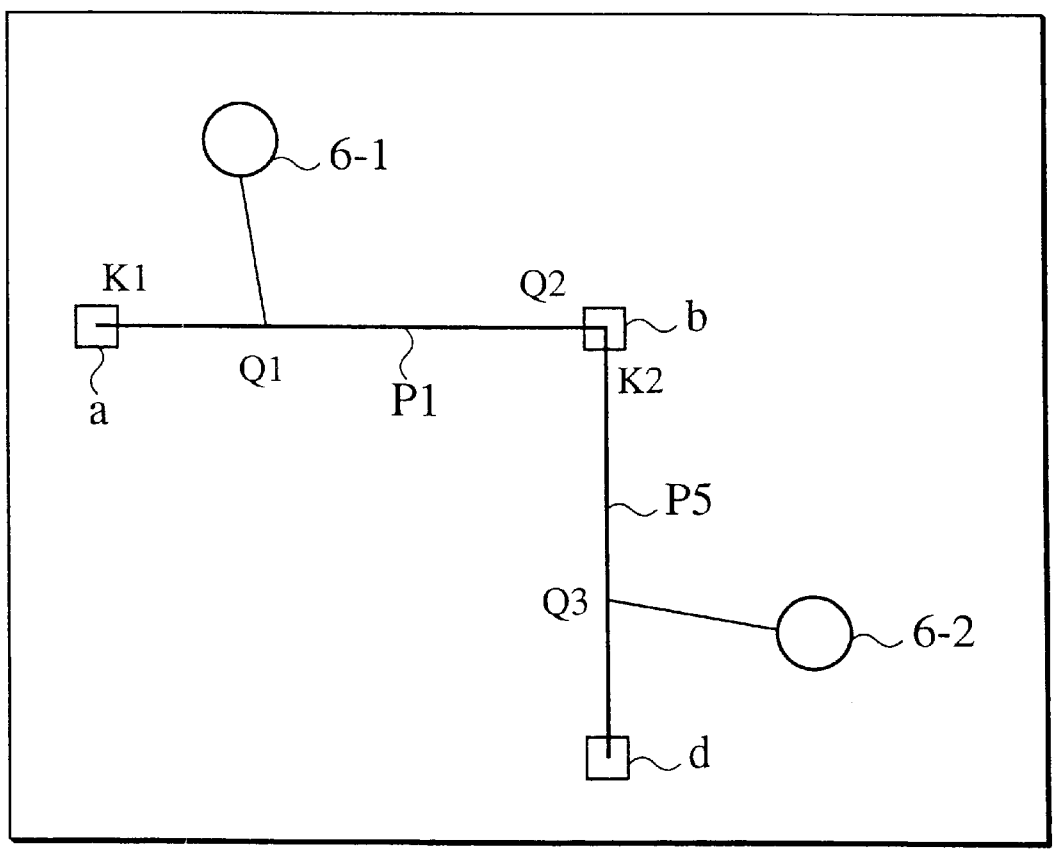
FIG. 21 is a diagram for showing another example of a method of calculating the length of a wire between auxiliary units.

Next, with reference to FIG. 21, another example of a method of calculating the total length of wires between the auxiliary units will be explained. At first, the first auxiliary unit 6-1 and the second auxiliary unit 6-2 are disposed on the route drawing. Then, a wire length K1 of the first route P1 and a wire length K2 of a fifth route P5 are set. Further, information on positional coordinates of passing points a, b(Q2) and d, positional coordinates of a connection point Q1 to the first route P1 of the first auxiliary unit 6-1, and positional coordinates of a connection point Q3 to the fifth route P5 of the second auxiliary unit 6-2, is set in the memory or the like.

In this status, the wire length of wires for connecting between the first auxiliary unit 6-1 and the second auxiliary unit 6-2 is calculated in the following process.

At first, a total length of wires (T) is set as 0. Next, a branch length from the first auxiliary unit 6-1 to Q1 is set as T. Then, the length between Q1 and Q2 is calculated from the length of K1. In this case, the length between Q1 and Q2 is obtained from the following expression.

The length of the basic route×((the distance between the coordinates of Q1 and Q2/the distance between the coordinates of the starting point and the ending point of the basic route)).

In other words, for calculating the length of the wire, the length Is obtained by proportionally dividing the coordinates of the branching position of the auxiliary unit by the coordinates of the basic route.

Next, the length from Q1 to Q2 is added to T. Then, based on the length of K2, the length from Q2 to Q3 is calculated, and the length from Q2 to Q3 is added to T. Lastly, the branched length from the second auxiliary unit 6-2 to Q3 is added to T. As a result, it is possible to obtain a total length (T) of the wires from the first auxiliary unit 6-1 to the second auxiliary unit 6-2.

As explained above, it is also possible to calculate the total length of wires based on the lengths of the routes, positional coordinates of Q1, Q2 and Q3, and branched lengths of the auxiliary units.

It is to be noted that the present invention is not limited to the wiring harness arrangement designing apparatus and the method therefor of the above-described embodiments, and the invention can also be applied to other fields by modification within a scope not deviating from the technical idea of the present invention.

What is claimed is:

1. A wiring harness arrangement designing apparatus comprising:

route information inputting means for inputting route information including route drawing information on routes of a plurality of wiring harnesses to be arranged within a vehicle and route length information of each route;

wiring information memory means for storing wiring information including auxiliary unit information on a plurality of auxiliary units connected to the plurality of wiring harnesses and wire information on attributes of a plurality of wires connected between the plurality of auxiliary units;

display means for displaying on a screen a route drawing based on the route information input by the route information inputting means;

position assigning means for assigning positions of the plurality of auxiliary units on the route drawing displayed on the screen based on the auxiliary unit information included in the wiring information stored in the wiring information memory means; and route/wiring linking means for mutually wire-connecting the plurality of auxiliary units through a selected route on the route drawing, and for linking the wiring information on the plurality of wire-connected auxiliary units to the route information on the selected route.

2. A wiring harness arrangement designing apparatus according to claim 1, wherein the route/wiring linking means wire-connects a pair of auxiliary units to be connected, out of the plurality of auxiliary units assigned by the position assigning means, in a shortest route through at least one route on the route drawing. and generates substantive wiring information having the wiring information linked to the route information.

3. A wiring harness arrangement designing apparatus according to claim 2, further comprising substantive wiring information memory, means for storing the substantive wiring information generated by the route/wiring linking means, wherein the substantive wiring information memory means stores wire-connection information for showing wire-connection from one auxiliary unit to another auxiliary unit through at least one route on the route drawing as the substantive wiring information, and also stores the wire information by making the wire information correspond to the wire-connection information.

4. A wiring harness arrangement designing apparatus according to claim 3, wherein the apparatus further comprises:

route selecting means for selecting any one route from within a plurality of routes on the route drawing displayed on the drawing; and summing means for reading out the wire information corresponding to the one route selected by the route selecting means based on the wire-connection information stored in the substantive wiring information memory means, and for summing up the number of wires based on the read out wire information.

5. A wiring harness arrangement designing apparatus according to claim 4, wherein the summing means sums up lengths of wires between auxiliary units based on a length of each route, coordinates of a starting point and an ending point of each route, coordinates of a route connection point on a route to which an auxiliary unit is connected, and a length of a wire from the route connection point to the auxiliary unit.

6. A wiring harness arrangement designing apparatus according to claim 4, wherein the summing means calculates a diameter of the wiring harness based on the number of wires summed up and a diameter of each wire.

7. A wiring harness arrangement designing apparatus according to claim 4, wherein the summing means sums up a total number of wires of the whole routes on the route drawing based on the wire-connection information and the wire information stored in the substantive wiring information memory means.

8. A wiring harness arrangement designing apparatus according to claim 3, wherein the display means displays the wiring information linked to the route information, on the same screen as the screen on which the route drawing based on the route information is displayed.

9. A wiring harness arrangement designing method, comprising the steps of:

inputting route information including route drawing information on routes of a plurality of wiring harnesses to be arranged within a vehicle and route length information of each route;

storing in wiring information memory means wiring information including auxiliary unit information on a plurality of auxiliary units connected to the plurality of wiring harnesses and wire information on attributes of a plurality of wires connected between the plurality of auxiliary units;

displaying on a screen a route drawing based on the route information input;

assigning positions of the plurality of auxiliary units on the route drawing displayed on the screen based on the auxiliary unit information included in the wiring information stored in the wiring information memory means;

mutually wire-connecting the plurality of auxiliary units through a selected route on the route drawing; and linking the wiring information on the plurality of wire-connected auxiliary units to the route information on the selected route.

10. A wiring harness arrangement designing method of claim 9, wherein the mutually wire-connecting step wire-connects a pair of auxiliary units to be connected, out of the plurality of auxiliary units assigned by the assigning step, in a shortest route through at least one route on the route drawing, and the method further comprises the step of generating substantive wiring information having the wiring information linked to the route information.

11. A wiring harness arrangement designing method according to claim 10, further comprising the step of storing the substantive wiring information, the substantive wiring information including wire-connection information for showing wire-connection from one auxiliary unit to another auxiliary unit through at least one route on the route drawing and the wire information corresponding to the wire-connection information.

12. A wiring harness arrangement designing method according to claim 11, further comprising the steps of:

selecting any one route from within a plurality of routes on the route drawing displayed on the screen;

reading out the wire information corresponding to the selected one route based on the wire-connection information included in the substantive wiring information; and summing up the number of wires based on the read out wire information.

13. A wiring harness arrangement designing method according to claim 12, wherein the summing up step sums up lengths of wires between auxiliary units based on a length of each route, coordinates of a starting point and an ending point of each route, coordinates of a route connection point on a route to which an auxiliary unit is connected, and a length of a wire from the route connection point to the auxiliary unit.

14. A wiring harness arrangement designing method according to claim 12, further comprising the step of calculating a diameter of the wiring harness based on the number of wires summed up and a diameter of each wire.

15. A wiring harness arrangement designing method according to claim 12, further comprising the step of a summing up total number of wires of the whole routes on the route drawing based on the wire-connection information and the wire information included in the substantive wiring information.

16. A wiring harness arrangement designing method according to claim 11, further comprising the step of displaying the wiring information linked to the route information, on the same screen as the screen on which the route drawing based on the route information is displayed.

* * * * *

UNITED STATES PATENT AND TRADEMARK OFFICE
CERTIFICATE OF CORRECTION

PATENT NO.    : 6,457,165 B1
DATED         : September 24, 2002
INVENTOR(S)   : Takeshi Ishikawa et al.

It is certified that error appears in the above-identified patent and that said Letters Patent is hereby corrected as shown below:

Column 14,
Line 60, "drawing." should read -- drawing, --.
Line 65, after "memory", delete the comma.

Column 16,
Line 48, after "step of", delete "a".
Line 49, "up total" should read -- up a total --.

Signed and Sealed this

Thirteenth Day of May, 2003

JAMES E. ROGAN
*Director of the United States Patent and Trademark Office*